United States Patent [19]

Datta et al.

[11] 4,378,310

[45] Mar. 29, 1983

[54] CONDUCTIVE MOLDING COMPOSITION

[75] Inventors: Pabitra Datta; Nestor A. Arroyo, both of Cranbury; Ronald N. Friel, Hamilton Square, all of N.J.

[73] Assignee: RCA Corporation, New York, N.Y.

[21] Appl. No.: 172,660

[22] Filed: Jul. 28, 1980

[51] Int. Cl.$^3$ .............................................. H01B 1/06
[52] U.S. Cl. .................................... 252/511; 252/500; 358/342; 358/344; 523/174; 524/495; 369/126; 369/276
[58] Field of Search .................. 252/500, 511, 54, 62; 260/23, 23 H, 98.16, 23 ED, 23 XA; 179/100.1 B, 100 AR; 358/128, 129; 525/86, 233, 238, 239; 523/174; 524/495, 496, 563, 568, 569, 565; 264/105, 106

[56] References Cited

U.S. PATENT DOCUMENTS

| | | | |
|---|---|---|---|
| 3,053,800 | 9/1962 | Grabowski et al. | 260/45.5 |
| 3,481,893 | 12/1969 | Pungs et al. | 260/998.16 |
| 3,842,194 | 10/1975 | Clemens | 179/100.1 B |
| 3,842,217 | 10/1974 | Clemens | 179/100.3 A |
| 3,909,517 | 9/1975 | Clemens | 179/100.1 B |
| 3,960,790 | 6/1976 | Khanna | 523/174 |
| 4,151,132 | 4/1979 | Khanna | 260/23XA |

*Primary Examiner*—J. L. Barr
*Attorney, Agent, or Firm*—Birgit E. Morris; Howard F. VanDenburgh

[57] ABSTRACT

An improved molding composition having a high thermal stability, including a vinyl chloride/vinyl acetate copolymer-based resin, sufficient finely divided conductive particles to obtain the desired conductivity, and from 3 to 20 weight percent of the modifying additive BLENDEX 586, which is a three-component blend of polyvinyl chloride, a graft copolymer of acrylonitrile, styrene and polybutadiene, and a copolymer of alpha-methyl styrene and acrylonitrile, as described in U.S. Pat. No. 3,053,800. High density information discs fabricated from this molding composition have improved dimensional stability and increased resistance to environmental temperature changes.

11 Claims, No Drawings

CONDUCTIVE MOLDING COMPOSITION

This invention relates to an improved molding composition. More particularly, this invention relates to an improved conductive molding composition from which high density information discs having improved properties can be fabricated.

BACKGROUND OF THE INVENTION

Information records containing video, audio, and color information in the form of a very fine surface relief pattern in a plastic disc are known. The surface relief pattern is monitored by a playback stylus and the surface variations are reconstituted in electrical signal form and converted back to information suitable for display by a television receiver.

For instance, a capacitance video recording and playback system is disclosed in U.S. Pat. Nos. 3,842,194; 3,842,217; and 3,909,517 to Clemens. According to this system, disc replicas can be prepared having geometric variations in a spiral groove in the disc surface which correspond to capacitance variations representative of video signals. The discs are coated first with a thin conductive metal layer and then with a dielectric layer. A metal stylus completes the capacitor and, during playback, rides upon the dielectric coating and detects dimensional variations in the groove. These variations are reconstituted in electrical signal form and converted back to video information suitable for display by a television receiver. In the Clemens system the disc and the playback stylus are electrically conducting and a dielectric layer is between them. The need to provide two layers produced a system that was cumbersome and expensive and led to a search for a conductive molding composition from which a conductive molded disc could be made.

Since the relief pattern and the groove are of very small dimensions, e.g., there are 5,000–10,000 grooves per inch (1,968–3,937 grooves per centimeter), much research and expense have been required to learn how to put down metal and dielectric layers which conform to the relief pattern, are thin enough so that they do not fill the grooves, and yet are thick enough to form a coherent, continuous, abrasion resistant and pinhole free layer.

Fox et al in copending application Ser. No. 105,550, filed Dec. 20, 1979, a continuation of application Ser. No. 818,279 filed July 25, 1977, have described noncoated, conductive video disc replicas made by molding a plastic molding composition containing sufficient finely divided conductive particles so that the material has a bulk resistivity below about 500, and preferably below 100 ohm-cm at 900 megahertz. They disclose that conductive compression molded video discs could be made using a polyvinyl chloride homopolymer or a copolymer resin containing stabilizers, lubricants, and processing aids and conductive particles having a low bulk density in an amount sufficient to produce the required conductivity.

In the scale up of the Fox et al composition to produce commercial quantities, difficulties were encountered with the molding composition. When mixing large quantities of this material, high temperatures are generated due to the high shear and length of time required for dispersion of the ingredients, particularly large amounts of conductive particles. Excessive temperatures led to decomposition and high volatiles generation, as well as staining and excessive bleed out of the additives. Further, the melt viscosity of the molding composition was too high for compression molding on a large scale. In addition, the video disc replicas were rather brittle and tended to warp on storage under high temperature and high humidity conditions.

The Fox et al molding compositions were stiff and difficult to process and, thus, a search was undertaken to improve the processing of the molding composition. In U.S. Pat. No. 4,151,132 to Khanna, a conductive molding composition is described that has improved processability and produces video discs which are less brittle and have reduced staining or bleed out of additives. Bleed out is undesirable because it changes the surface characteristics of the discs, producing a high noise level. Khanna's solution was to mix small amounts of a large number of additives, including lubricants, stabilizers, and processing aids, into a mixture of vinyl chloride resins. These molding compositions are processable and moldable to form video discs of good quality. However, these discs are unsatisfactory from the standpoint of high temperature storage as the compositions have a comparatively low heat distortion temperature which results in permanent deformation or warpage and shrinkage of the disc when stored at elevated temperatures, e.g., above about 100° F. (37.8° C.).

Therefore, a search has continued to obtain conductive molding compositions which have good processability, are moldable to form conductive information discs of excellent playback characteristics, possess good thermal stability during compound processing and molding, provide good replication of submicron size surface relief patterns, and possess good dimensional stability on storage under various environmental conditions.

SUMMARY OF THE INVENTION

We have found a molding composition having a bulk resistivity below about 500 ohm-cm at 900 megahertz which is readily processable, has a high thermal stability and can produce high density information discs having improved dimensional stability. This molding composition comprises a vinyl chloride/vinyl acetate copolymer-based resin containing sufficient finely divided conductive particles to obtain the desired conductivity; from about 3 up to about 15 percent by weight of the modifier additive BLENDEX 586 supplied by Borg-Warner Corporation and described in U.S. Pat. No. 3,053,800; along with sufficient amounts of other lubricants, stabilizers, processing aids, modifiers and the like. The resultant molding composition can be fabricated into high density information discs having improved dimensional stability and resistance to the effects of changes in environmental temperatures.

DETAILED DESCRIPTION OF THE INVENTION

Because of the uniqueness and very small dimensions of the information on high density information discs, a composition suitable for molding such discs must have a uniform dispersion of the conductive particles and the other additives in the resin so that the molded article will have a uniform surface free of defects, minimum shrinkage and warp characteristics and a high heat distortion temperature. The composition must be readily processable to form a very small relief pattern over the surface of a 12 inch disc; and sufficient additives must be added to overcome the stiffness and brittleness imparted by the large quantity of conductive particles present. However, if a large quantity of total additives are present, the additives bleed to the surface causing nonuniformities and staining, which adversely affect the disc quality and may even render the disc unplayable by filling up the tiny grooves or information tracks monitored by the stylus. In addition, the disc must be insensitive to changes in temperature and humidity that may be encountered during storage and shipping.

According to the present invention, the improved molding composition thereof includes a vinyl chloride/vinyl acetate copolymer-based resin, finely divided conductive particles, particularly carbon black, the modifier additive BLENDEX 586, and various other stabilizers, lubricants, processing aids, and modifiers. The resin employed in the molding composition of this invention is a copolymer of vinyl chloride and vinyl acetate supplied by Union Carbide Corporation and identified as their resin VYHH. The copolymer has a $T_g$ of approximately 78° C., a number average molecular weight range of from about 30,000 to about 50,000 (weight average 50,000–100,000), and contains from about 5 up to about 20 percent by weight of vinyl acetate. The vinyl acetate is preferably present in the copolymer in an amount of approximately 15 percent based on the weight of the total copolymer. The vinyl chloride/vinyl acetate copolymer resin is present in the molding composition of this invention in amount of from about 60 up to about 80 percent by weight based on the total weight of the molding composition. In order to produce desired characteristics in the molded articles the copolymer resin should have a high heat distortion temperature, preferably 140° F. (60° C.) or higher for the unfilled resin.

The BLENDEX 586 modifying additive is employed in the molding composition in amounts of from about 3 up to about 20 percent by weight of the total molding composition, and preferably in an amount of from about 5 up to about 12 weight percent. This additive, BLENDEX 586, is commercially available from Borg-Warner Corporation and is a three-component blend of polyvinyl chloride, a graft copolymer prepared from acrylonitrile, styrene and polybutadiene, and a copolymer of alpha methyl styrene and acrylonitrile, all as more fully explained and described in U.S. Pat. No. 3,053,800. The addition of this modifier to the molding composition increases the thermal stability of the composition, and high density information discs molded from this composition exhibit improved dimensional stability without sacrifice in the playback performance of such discs.

Conductive particles suitable for use in the molding composition of this invention include highly electrically conductive, finely divided carbon blacks, preferably which have a low bulk density to reduce loading requirements. A presently preferred product is commercially available from the Armak Company, as Ketjenblack EC, which has an apparent bulk density of about 140–160 grams per liter and an average particle size of about 300 angstroms. These carbon black particles have a high surface area and high proportion of voids within the particles as measured by dibutylphthalate absorption. This characteristic enables current to flow between the conductive particles in a non-conductive polymer matrix in a highly efficient manner. Other carbon blacks can also be employed if they meet the electrical requirements. Denser carbon particles will usually require higher loading, e.g., up to about 35–40 percent by weight for an equivalent conductivity, which must be at least 500 ohm-cm at 900 megahertz (MHz) in order for the video signals to be reconstituted on playback with a metal-tipped stylus. The particle size of such conductive carbon particles is not critical, but in general the particle size should be less than 500 angstroms to prevent the formation of a grainy surface in the plastic matrix. An amount of from about 12 up to about 20 percent by weight of a carbon black such as Ketjenblack EC is preferred.

Various additional ingredients can now be mixed with the resin, conductive particles and modifying additive BLENDEX 586 to form the molding composition. These additional ingredients include stabilizers, lubricants, processing aids, other modifiers and the like as is well known.

Antioxidant stabilizers suitable for use in the present invention include organometallic compounds derived from metals including tin, lead, zinc, barium and cadmium, such as dibutyl tin-beta-mercaptopropionate, dibutyl tin maleate, and the like. Epoxides, phosphites, and alkylated phenols such as t-butyl catachol can also be employed. Generally, these stabilizers are employed in a minor amount, i.e., about 2 to about 4 percent by weight of the total molding composition. These stabilizers act primarily to neutralize volatiles formed as decomposition products of the resin.

Internal and external lubricants are also generally added to the BLENDEX 586-modified PVC/PVA resin-based molding composition. Suitable lubricants include fatty acids and esters, such as stearic acid, fatty acid esters of alcohols and acids, polyfunctional acid and alcohol esters, soaps including calcium stearate, fatty acid amides such as stearic acid amide, oleamide, ethylene and bis stearamide and the like, and silanes such as dimethyl siloxane. Sufficient lubricant is added to prevent high shear heating during processing and to prevent the composition from sticking to the mold during processing. The presently preferred lubricant system is a mixture of an internal and external lubricant, which is employed in a minor amount, such as from about 0.5 to about 5 weight percent of the molding composition.

Small amounts, from about 1 to about 5 percent by weight of the molding composition, of processing aids, such as polyvinyl chloride terpolymers, polymethyl methacrylate polymers and the like, are also generally added to the present molding composition. The amount of additives employed is dependent upon the particular resin used and the amount of conductive particles added to the resin, as well as the molding procedure to be followed.

The total amount of the liquid modifiers employed should be carefully controlled, and these liquid modifiers must be compatible with the resin so that they will not bleed to the surface thereof. The solid modifiers employed can be either compatible or incompatible with the resin. The compatible modifiers used have a much greater effect on the shrinkage and heat distortion temperature of the resin composition, whereas incompatible modifiers act more like fillers and have much less effect on these properties. A certain amount of compatible modifiers should be present for processability and to overcome the stiffening effect of the large amounts of conductive particles incorporated in the resin. However, if too large an amount of liquid modifiers are employed, the $T_g$ and heat distortion temperature of the molding composition are reduced and the warpage and shrinkage characteristics of the articles molded from the composition will be undesirably high.

By employing the BLENDEX 586 in the molding composition of this invention, we have found, that it is possible to incorporate lower percentages or much smaller amounts of the other additional ingredients such as stabilizers, lubricants, processing aids, modifiers, and the like in this molding composition than has been possible in prior known and used molding compositions. By using the BLENDEX 586 modifying additive of this invention we have found that we can incorporate as little as 5 weight percent or less of these other additives or ingredients into the molding composition. This also aids in providing articles molded from the composition which have improved dimensional stability.

The present molding composition can be prepared by mixing all of the solid ingredients first in a blender such as a Henschel mixer until the temperature reaches about 120° F. (49° C.) and then adding the liquid ingredients, which coat the solid particles. The mixing is continued until the temperature reaches at least about 160° F. (71° C.). The composition is then collected and charged to a Banbury mixer or other suitable apparatus to melt the ingredients under shear. The composition is then mixed until it is molten, about 350°–380° F. (176°–190° C.), and then may be sheeted on a two-roll mill, pelletized, and stored for molding at some future time. The molded articles, particularly high density information discs, can be made by compression molding in the conventional manner, e.g., forming a preform, compression molding using a 30–60 second cycle at about 325°–380° F. (163°–190° C.), and removing the flashing.

For the high density information discs of this invention, a thin dielectric layer must be present at the surface of the disc. This dielectric layer is generally provided by the presence of a thin film of the molding composition resin around each conductive carbon particle and by the presence of the lubricant in the molding composition which can bleed to the surface, also forming a thin dielectric film. In addition, a thin lubricant film can also be applied as a separate layer on the disc. This film serves as an added dielectric layer and also serves to reduce stylus wear. One lubricant that has been employed successfully is a methylalkylsiloxane of the formula:

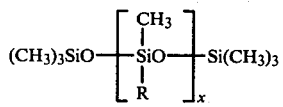

wherein R is an alkyl group of 4 to 20 carbon atoms and x is a integer, which can be applied by spinning from solution or by evaporation.

For the present indicated use, high density information discs, suitability of the conductive plastic material is also determined by measuring certain dielectric properties during playback of such molded discs. A test signal is recorded at a carrier frequency of 5 MHz. Carrier level (C) at 5 MHz, measured at millivolts peak to peak, is a function of the resistivity of the filled molding composition and generally increases at lower resistivities. The prior art metal coated discs can provide recovered carrier level of about 7.4 millivolts peak to peak; a similar level is desirable for the present discs, although good pictures can be viewed at lower levels of about 1 millivolt peak to peak.

Another property which measures the quality of the recovered video picture is the carrier-to-noise level ratio (C/N) obtained during playback of a signal recorded at 5 MHz, which ratio should be as high as possible and at least about 40 decibels (dB) for commercially acceptable video.

The following specific examples are included in order to illustrate the invention with greater particularity; however, it is to be understood that these examples are not intended to limit the invention in any way.

EXAMPLE I

A molding composition was prepared by dryblending the following ingredients in a Henschel mixer: 80.75 parts of the Union Carbide vinyl chloride/vinyl acetate copolymer, VYHH; 1.5 parts of T-35, a dibutyltin-beta-mercaptopropionate stabilizer, 1.0 part of Mark 275, a liquid dibutyltin maleate stabilizer; 0.5 part of Loxiol G-30 lubricant; 0.25 part of Loxiol G-70 lubricant; 0.3 part of calcium stearate lubricant; 0.4 part of wax E, an esterified montan wax lubricant, commercially available from Hoescht Company; and 0.3 part of Oil Vaselina, a liquid low molecular weight paraffin lubricant, for a period of approximately 10 minutes. Thereafter, 15.0 parts of Ketjenblack EC carbon particles were added to the Henschel mixer and the total ingredients of the formulation were dry-blended therein for an additional 10 minutes, or until the temperature reached about 190° F. (87.8° C.). The compounded mixture was allowed to cool to room temperature and then charged to a Brabender plasticorder from which the same was melt-extruded in the form of pelletized molding composition. The glass transition temperature ($T_g$) and the thermal stability was determined for this molding composition and is recorded hereinbelow in Table 1.

The glass transition temperature was determined by differential scanning calorimetry (DSC) at a heating rate of 20° C. per minute. An Instron Capillary Rheometer was used for determining the thermal stability of the composition. Shear stress was measured as a function of time at 45 sec$^{-1}$ shear rate and at 190° C. The shear stress reaches an equilibrium after two minutes of the measurement, and this equilibrium value remains unchanged until the composition begins to decompose, at which point the shear stress gradually increases with time. The time at which the linear and non-linear portions of this shear stress curve intersects is estimated as the thermal stablity time. Table 1 below summarizes the stability time for the molding composition.

Similar molding compositions were prepared containing 4.0, 8.0, and 12.0 parts of the modifying additive BLENDEX 586, with accordingly proportionately smaller amounts of the vinyl chloride/vinyl acetate copolymer. The glass transition temperature as well as the thermal stability of these additional molding compositions were determined and also are recorded in Table 1 below.

TABLE 1

| Sample | Glass Transition Temp. $T_g$ - °C. | Instron Thermal Stability at 190° C. Time to Breakdown - Min. |
|---|---|---|
| A (control) | 72 | 9 |
| B—4 parts Blendex 586 | 73 | 15 |
| C—8 parts Blendex 586 | 74 | 15 |
| D—12 parts | | |

TABLE 1-continued

| Sample | Glass Transition Temp. $T_g$ - °C. | Instron Thermal Stability at 190° C. Time to Breakdown - Min. |
|---|---|---|
| Blendex 586 | 77 | 20 |

EXAMPLE II

The electrical resistivity of the various sample molding compositions of Example I was determined and compared. The data as determined are summarized below in Table 2.

TABLE 2

| | Resistivity (ohm-cm) | |
|---|---|---|
| Sample | AC (at 900 MHz) | DC |
| A (control) | 2.2 | 3.0 |
| B | 2.2 | 3.0 |
| C | 2.7 | 3.5 |
| D | 3.4 | 4.0 |

It is apparent that the addition of the modifying additive BLENDEX 586 to the molding composition does not adversely effect the electrical properties of the molding composition.

EXAMPLE III

High density information discs were molded from the compositions of Samples A, B, C, and D of Example I by first mixing the materials of the molding compositions in a Brabender single screw extruder and then pressing the discs from the disc master described by Clemens above. A thin layer of a methylalkylsiloxane lubricant available from General Electric Company, as SF-1147, was evaporated onto the surface of each disc.

The resultant discs from each of the four molding compositions were played with a diamond stylus in a playback system as also described by Clemens above. For each of the discs, the carrier output, video carrier-to-noise ratio, and audio signal-to-noise ratio were determined. From these values, as summarized below in Table 3, it can be readily seen, by the addition of small amounts of the modifying additive BLENDEX 586, that the carrier output, video carrier-to-noise ratio, and audio signal-to-noise ratio are not adversely affected.

TABLE 3

| Disc Composition | Carrier Output Millivolt - peak-to-peak | Video Carrier-to-Noise Ratio - dB | Audio Carrier-to-Noise Ratio - dB |
|---|---|---|---|
| Sample A (control) | 14.8 | 55 | 27 |
| Sample B | 12.5 | 55 | 28 |
| Sample C | 12.0 | 54 | 28 |
| Sample D | 11.0 | 54 | 29 |

EXAMPLE IV

In this example the dimensional stability of each of the discs prepared from samples A, B, C, and D in Example III was determined by evaluating the shrinkage and warpage of each of these discs.

The shrinkage was determined by mounting each of the discs on a center spindle of a relief plate for the duration of the tests. After the initial outside diameters were determined, the discs were placed in an oven at about 130° F. (54.4° C.) for a substantial period of time. The discs were removed from the oven at various time intervals and allowed to cool to room temperature. After cooling, the outside diameters were again determined and the cumulative change in the outside diameters were noted. The discs heated at 130° F. (54.4° C.) reached their maximum shrinkage after 150 hours. The average initial and final diameters and the average percentage shrinkage after 150 hours of stress in the oven at 130° F. are summarized in Table 4 below. The difference in the diameter of the disc before and after the heat treatment when compared to the original diameter of the disc is expressed as the percentage shrinkage.

The warpage of each of the discs was determined by the use of a capacitance probe obtained from Microsense Corporation, Watertown, Mass. The discs were placed on a relief plate, and then the initial warpage of each was determined by measuring the surface profile at both the inside and outside diameter of the disc with the capacitance probe. The maximum height of the surface profile was recorded. The difference between the maximum inside and outside height (in mils) for each disc was calculated before heat treatment. The post heat treatment or after stress disc warpage measurements were taken after the discs were removed from the oven at various time intervals and allowed to cool to room temperature. The discs stressed or heated in the 130° F. oven reached a maximum warpage after 90 hours. The average initial and average final warpages after 90 hours at 130° F. for these discs are summarized below in Table 4.

TABLE 4

| | DIMENSIONAL STABILITY | | | | |
|---|---|---|---|---|---|
| | SHRINKAGE | | | WARPAGE | |
| Sample | Average Initial Outside Diameter In. | Average Post Stress Outside Diameter - In. | % Shrinkage | Initial Disc Warpage Mils | Post Stress Disc Warpage Mils |
| A (control) | 11.895 | 11.835 | 0.50 | 4.5 | 16.8 |
| B | 11.893 | 11.852 | 0.34 | 3.5 | 8.5 |
| C | 11.895 | 11.871 | 0.20 | 2.8 | 1.9 |
| D | 11.894 | 11.880 | 0.12 | 3.3 | 3.0 |

As can be readily seen from Table 4, the shrinkage and warpage of the discs improves with added amounts of the modifying additive BLENDEX 586.

What is claimed is:

1. In a high density information recording medium, adapted for use with a playback stylus to effect recovery of signals occupying a bandwidth of at least several megahertz when relative motion at a desired rate is established between said recording medium and said stylus, said recording medium comprising a disc of molded plastic material comprising a vinyl chloride/vinyl acetate copolymer containing a sufficient amount of finely divided conductive carbon black particles such that the material has a bulk resistivity below about 500 ohm-cm. at 900 MHz and having an information track constituted by a surface relief pattern in said track whereby said signals are recovered upon establishment of said motion at said rate, the improvement which comprises adding to said plastic material a modifying additive comprising a three-component blend of polyvinyl chloride, a graft copolymer of acrylonitrile, styrene and polybutadiene and a copolymer of alpha-methyl styrene and acrylonitrile in an amount of from about 3 up to about 20 percent by weight of the total molding composition, said amount being sufficient to improve the dimensional stability of said recording medium.

2. A recording medium according to claim 1 wherein said bulk resistivity is below about 100 ohm-cm. at 900 MHz.

3. A recording medium according to claim 1 wherein said carbon black particles have an apparent bulk density of about 140–160 grams per liter and are contained in said plastic material in an amount of from about 12 up to about 20 percent by weight of the total molding composition.

4. A recording medium according to claim 2 wherein said disc has a spiral groove on the surface containing said information track with said groove being dimensioned for reception therein of said playback stylus.

5. A recording medium according to claim 2 wherein a layer of methylalkylsiloxane lubricant of the formula:

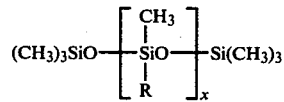

wherein R is an alkyl group of 4 to 20 carbon atoms and x is an integer, is disposed over the recording medium.

6. A recording medium according to claim 3 wherein said modifying additive is added to the molding composition in an amount of from about 5 up to about 12 percent by weight.

7. A recording medium according to claim 2 wherein the molding composition comprises additional additives including stabilizers, lubricants, plasticizers, and processing aids, with said additional additives being present in an amount of 5 or less percent by weight of the total molding composition.

8. In a conductive molding composition comprising a moldable plastic material comprising a vinyl chloride/vinyl acetate copolymer containing a sufficient amount of finely divided conductive carbon black particles such that the material has a bulk resistivity below about 500 ohm-cm. at 900 MHz, the improvement which comprises adding to said plastic material a modifying additive comprising a three-component blend of polyvinyl chloride, a graft copolymer of acrylonitrile, styrene and polybutadiene, and a copolymer of alpha-methyl styrene and acrylonitrile in an amount of from about 3 up to about 20 percent by weight of the total molding composition, said amount being sufficient to improve the thermal and dimensional stability of said molding composition.

9. A molding composition according to claim 8 wherein said bulk resistivity is below about 100 ohm-cm. at 900 MHz.

10. A molding composition according to claim 8 wherein said carbon black particles have an apparent bulk density of about 140–160 grams per liter and are contained in said plastic material in an amount of from about 12 up to about 20 percent by weight of the total molding composition.

11. A molding composition according to claim 8 wherein the molding composition additionally comprises from about 2 up to about 4 weight percent of stabilizers, from about 0.5 up to about 5 weight percent of lubricants, and from about 1 up to about 5 weight percent of processing aids, with said additional additives being present in a total amount of 5 or less weight percent of the total molding composition.

* * * * *